Feb. 8, 1966  R. D. FOX ETAL  3,233,980
MULTIPLE PURPOSE CHEMICAL PROCESSING UNIT
Filed Aug. 27, 1963  2 Sheets-Sheet 1
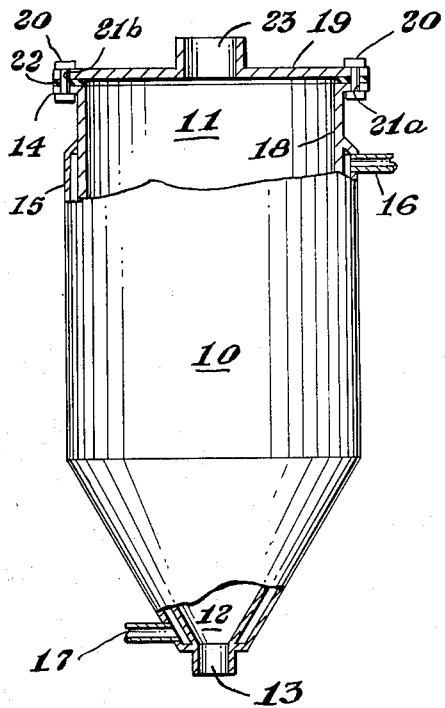
Fig. 1
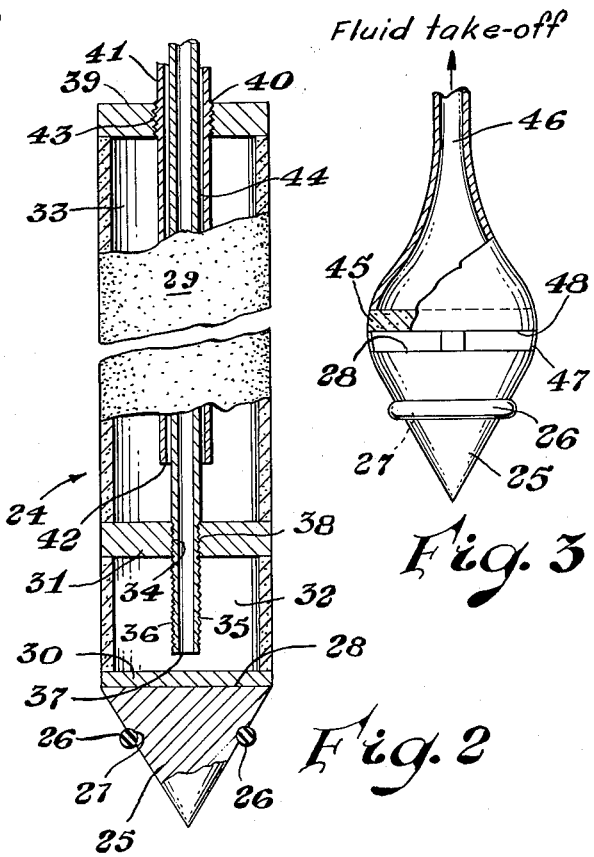
Fig. 2
Fig. 3
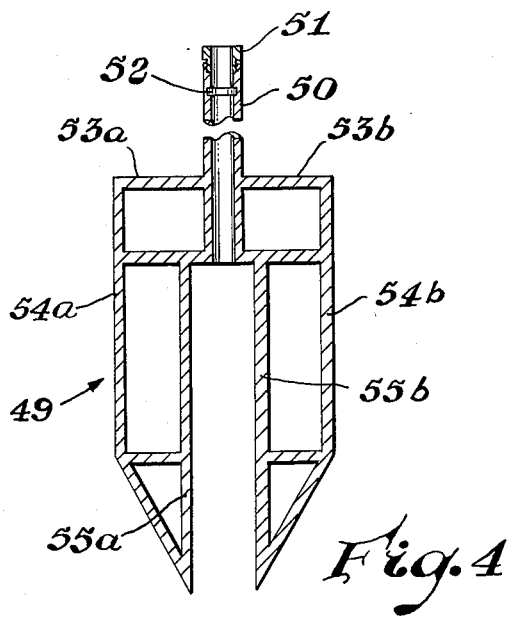
Fig. 4
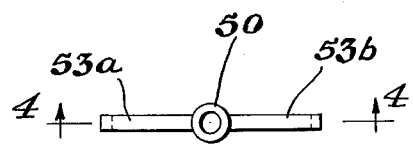
Fig. 5
INVENTORS.
Robert D. Fox
David L. Strand
BY C. Kenneth Bjork
AGENT

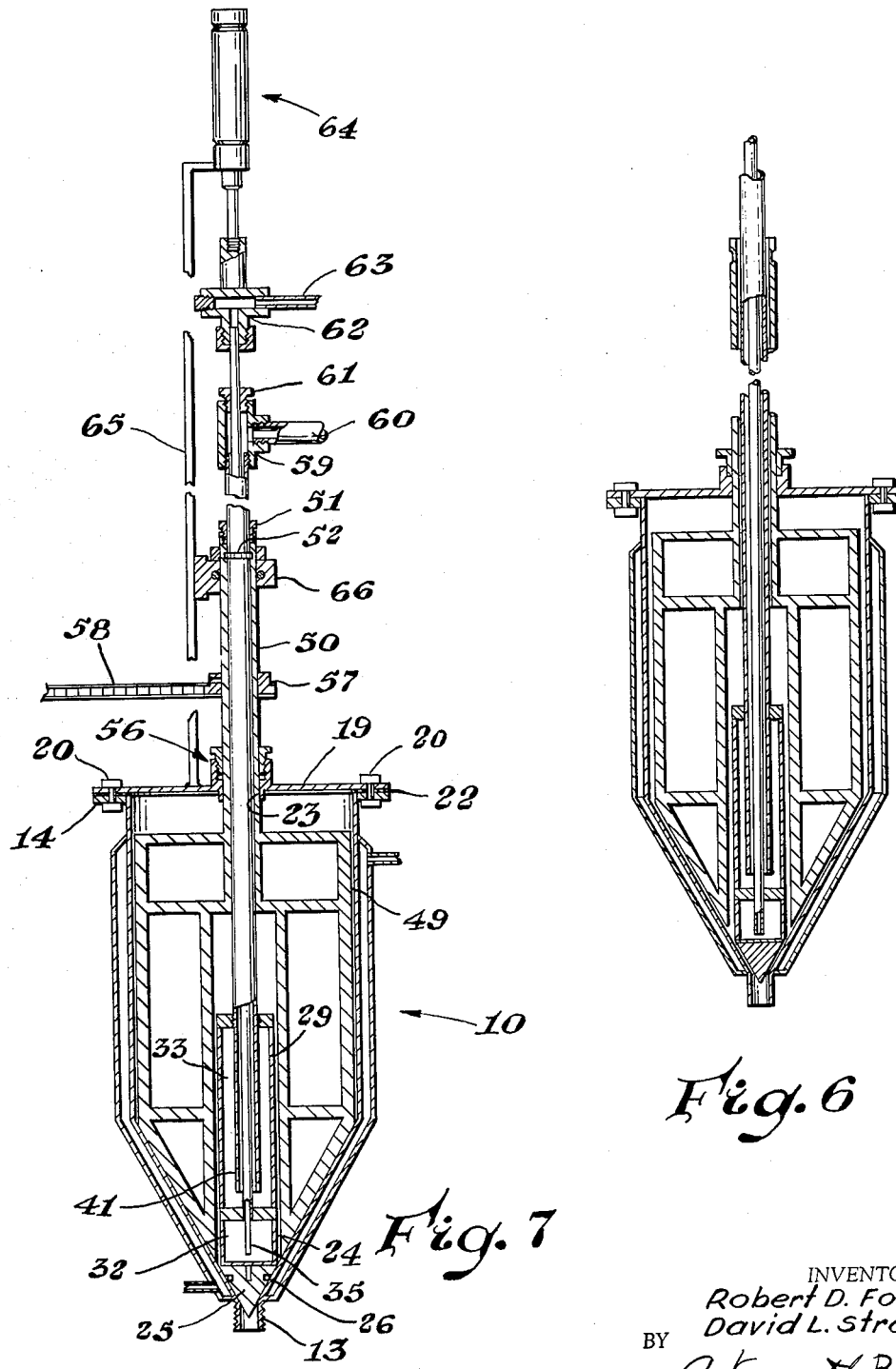

United States Patent Office 3,233,980
Patented Feb. 8, 1966

3,233,980
MULTIPLE PURPOSE CHEMICAL PROCESSING UNIT
Robert D. Fox, Midland, Mich., and David L. Strand, St. Paul, Minn., assignors to The Dow Chemical Company, Midland, Mich., a corporation of Delaware
Filed Aug. 27, 1963, Ser. No. 305,576
3 Claims. (Cl. 23—284)

This invention relates to a chemical processing unit and more particularly is concerned with an apparatus capable of performing a multiplicity of chemical processing operations.

It is a principal object of the present invention to provide a novel apparatus for carrying out a number of chemical processing operations.

It is another object of the present invention to provide a single, unitized apparatus which lends itself to performing a number of unit operations such as crystallization, filtration, washing, drying, blending and packaging, for example.

It is a further object of the present invention to provide a process apparatus of simple design which has utility in performing a variety of individual or integrated unit process operations.

It is an additional object of the present invention to provide a multipurpose processing apparatus which can be remotely operated for carrying out reactions and other processing steps on hard to handle and potentially hazardous materials.

It is also an object of the present invention to provide a multiple purpose apparatus for handling and processing solids, slurries and liquids.

These and other objects and advantages will become apparent from the detailed description presented hereinafter when read in conjunction with the accompanying drawings.

In general the apparatus of the present invention comprises a reaction vessel fitted internally with a filter assembly and a paddle agitator.

In the figures:

FIGURE 1 is an elevation, partly in section, of one embodiment of a reactor vessel and cover of the present invention.

FIGURE 2, partly in section, is an elevation of one embodiment of a filter assembly for use in conjunction with the reactor vessel of FIGURE 1.

FIGURE 3, partly in section, is an elevation of a second embodiment of a filter assembly for use in conjunction with the reactor vessel of FIGURE 1.

FIGURE 4 is a sectional elevation of an embodiment of a paddle agitator for use with the reactor vessel in FIGURE 1.

FIGURE 5 is a top view of the paddle agitator of FIGURE 4.

FIGURE 6 is a schematic elevation, in section, of the apparatus showing the depicted reactor vessel, two compartment filter assembly and paddle agitator of FIGURES 1-5 in operating assembly.

FIGURE 7 is a detailed sectional elevation of the multiple purpose apparatus showing an embodiment of the assembly with auxiliary operating equipment.

The embodiment of reactor vessel 10 as shown in FIGURE 1 consists of a cylindrical upper section 11 having a conical bottom section 12. The lower end of the conical section 12 tapers inwardly to a bottom discharge port 13. The upper section 11 has an outwardly facing flange 14 at its top. A hollow jacket 15 surrounds the reactor vessel 10 over almost its entire length. This jacket 15 is fitted with a port 16 on one side near the top and a second port 17 near the bottom.

The jacket 15 provides a means of temperature control, either heating or cooling, by passage of a heat transfer fluid therethrough.

Alternatively, if desired, this jacket could be eliminated and the reaction vessel 10 be a single wall vessel. In this alternative embodiment, temperature control can be achieved by heating or cooling coils, electrical heating tapes and the like heating and cooling means positioned around the exterior of the vessel 10.

Preferably the interior wall 18 of the vessel 10 is provided with a smooth finish. This is particularly desirable when the apparatus is employed in processes involving the handling of solids so as to reduce solids accumulation on the walls of the vessel to a minimum.

A cover 19 mates with the flanged top 14 of the reactor vessel 10.

This cover 19, as shown, is attached to the vessel 10 by means of bolt and nut assemblies 20 passing through mating openings 21a–21b spaced at intervals around the outer periphery of the cover 19 and flange 14. Ordinarily, a gasket 22 is positioned between the cover 19 and flanged top 14 upon assembly. If desired, the face of the outer portion of cover 19 and/or face of flange 14 contacting the gasket 22 can be serrated or otherwise slightly roughened to assure a firm grip and tight seal between the cover 19 and reactor 10.

The cover 19 is fitted with a center port 23. This port 23 serves as a packing gland housing for a shaft and is discussed in detail hereinafter.

Additional ports and connectors for accommodation of auxiliary stirrer shafts, thermocouples, liquid, solid and gaseous material feed and delivery lines and the like equipment can be placed in cover 19 at predetermined positions as required or desired for specific operations.

A preferred filter assembly 24 for use with the reactor 10 is shown in FIGURE 2. This assembly 24 has a conical plug bottom member 25. This plug 25 is fabricated to fit snugly against the sloping inner wall 18 of the bottom section 12 of reactor 10 thereby effectively sealing off the discharge port 13. Plug 25, in the depicted embodiment, is fitted with an O-ring seal 26 positioned at a predetermined distance between the base and point of the conical plug 25. Conveniently, the seal 26 is constructed of an elastic material. As shown, the seal 26 readily can be held in a predetermined position on plug 25 by mating with a groove 27 passing circumferentially around the cone shaped plug 25.

When the plug 25 is positioned so as to seal-off the discharge port 13, the seal 26 rests against sloping wall 18 of the conical section 12 of reactor 10 thereby assuring a tight seal.

Attached to the top 28 of plug 25, i.e. the base of the cone, is a tubular, two-compartment filter element 29. This element 29 has a blind base 30 which is attached to the top 28 of plug 25. Both plug 25 and base 30 preferably are detachably connected to the filter element 29 for ready ease of changing filter elements 29.

A solid, plate-like divider 31 positioned a predetermined distance away from and parallel to base 30 provides a top for the lower filter compartment 32 as well as serves as the bottom for the upper filter compartment 33. The divider 31 is fitted with a center opening 34 which accommodates a fluid take-off line 35. As shown, this take-off line 35 has threads 36 extending upwardly for a distance from its lower end 37. Threads 36 mate with threads 38 in opening 34 of divider 31 thereby providing for ready attachment and assured positioning in the center of the filter element 29 such that the lower end 37 is a predetermined distance away from the base 30 of filter compartment 32. Alternatively, the lower portion of take-off line 35 can be of a smaller diameter than opening 34 so as to slide freely therethrough. The only portion of line 35 which needs threads 36 mating with threads 38 in opening 34 is that section which provides for positioning of line 35 such that end 37 is near the bottom 30 of the filter element 29.

A non-porous top member 39 having a threaded center opening 40 is attached to the upper end of filter compartment 33.

A second filtrate take-off line 41 of larger diameter than take-off line 35 is fitted concentrically over line 35 and extends downwardly a predetermined distance into filter compartment 33 having its lower end 42 near the divider 31. Take-off line 41 has a threaded shoulder 43 the threads of which mate with those of the threaded center opening 40 in filter top 39. This assembly provides an annulus 44 between the fluid take-off lines 35 and 41 through which liquids are removed from filter compartment 33.

The take-off lines 35 and 41 exit from the reactor vessel 10 through cover port 23. Conventional packing glands or other liquid and gas tight sealing means can be employed to assure a tight, dynamic seal at this junction. The term "dynamic seal" as used herein refers to a pressure, solids, fluid and gas tight seal which still permits movement of the member passing through the packing gland of the seal. In a preferred form of the apparatus employing a paddle agitator, the take-off lines 35 and 41 can pass up through the hollow shaft of the agitator. This will be discussed in detail hereinafter. The take-off lines 35 and 41 can be connected to separate receivers or a common filtrate receiver. Each line can be fitted with separate valving mechanisms for independent control.

The overall length of the filter assembly 24 proper, i.e. from the tip of the cone plug 25 to the top 39, is somewhat less than the internal length of the reactor vessel 10 in order that the filter 24 can be raised vertically to disengage the plug 25 from discharge port 13 thereby effecting removal of solids from the reactor vessel 10.

The two-compartment filter element 29 of the depicted embodiment offers the advantage of removing large volumes of fluid through both compartments 32 and 33 for most of a filtering cycle as well as provides for efficient removal of substantially all of the free liquid during the last stages of filtering by use of the smaller bottom section 32 alone. The substantially complete removal of the filtrate liquid is promoted further by extending the lower end 37 of take-off line 35 close to the bottom of compartment 32.

Alternatively, instead of the two-compartment filter assembly 24, a single compartment filter with a tight fitting sliding outer cover can be used to obtain varying filter areas. In use, as the liquid level drops, the outer sleeve of this latter filter would be lowered thereby maintaining the exposed portion of filter bow the liquid level.

For operations where only partial fluid removal is desired, or a continuous flow of material to be filtered is fed into the reactor 10, a single compartment cylindrical or other shaped filter can be used.

Another suitable filter is a substantially flat, disc-like filter which can be positioned near the top of the plug 25 as shown in FIGURE 3. In this embodiment, a disc filter member 45 is held in a housing 46. The housing 46 is joined to the top 28 of conical plug 25 by a plurality of spaced apart projections 47 around the lower periphery of the housing 46. These projections 47 are of a predetermined length such that an open space is provided between the top 28 of the plug 25 and the face 48 of filter 45 opposite.

The actual shape or type of filter assembly to be employed for a particular operation can be any of a wide variety of designs as is apparent to one skilled in the art. It is essential only that the filter element be connectable to the sealing plug 25, that the filter assembly be of such a size and shape to fit within the reactor vessel 10 and be vertically movable therein, and that it be provided with a suitable filtrate take-off means.

The selection of material for use as the actual filter means or element is determined by the liquids to be filtered and filtration conditions. Fiberglass, glass beads, metal turnings and metal flakes in suitable holders, fritted glass, porous sintered powdered metal compacts, porous refractory materials and the like, for example, can be used.

A particularly suitable filter medium for use in the present apparatus which has a high resistance to corrosive attack, good machinability and a good structural stability is porous, sintered stainless steel.

The paddle agitator 49 depicted in FIGURES 4 and 5 consists of a hollow shaft 50. This shaft 50 is designed to accommodate take-off lines 35 and 41 of the two-compartment filter assembly 24. Shaft 50 is fitted at its top with a packing nut 51 and internal O-ring seal 52 which provides a dynamic seal between the paddle shaft and outer take-off line 41 thereby providing for vertical movement of the line 41 within shaft 50.

Attached to the bottom of shaft 50 are two diametrically opposite positioned open frame paddles 53a and 53b. These paddles 53a–53b are designed to have their outer members 54a–54b match the contour of the inner wall 18 of reactor 10. The paddles 53a–53b extend outwardly so as to provide a close clearance with the inner wall 18 of reactor 10 thereby serving both as an agitator and scraper, or doctor blade, during operation. The inner vertical members 55a–55b are spaced apart such that the filter assembly can be fitted between these and moved vertically up and down when in place.

A two-bladed open-frame agitator has been shown. However, it is to be understood that a single blade stirrer, or a three-, four- or more bladed agitator can be used if desired. Further, instead of the depicted combination agitator-scraper, the paddle blade can be designed to agitate only and not scrape materials from the sidewall of the reactor vessel. Additionally solid paddles, with or without holes therein can be used instead of the depicted open-frame configuration. Likewise, paddles of other design can be employed to provide certain types of mixing action in specific applications using the present apparatus.

The assembled combination of reactor, filter and paddle agitator are shown schematically in FIGURE 6.

A detailed drawing of the assembly of one embodiment of the multiple purpose apparatus with auxiliary valving and control equipment is shown in FIGURE 7. This assembly consists in combination of a flanged, jacketed reaction vessel 10 having a bottom discharge port 13. A two-compartment filter assembly 24 having a conical plug 25 fitted with an O-ring seal 26 is positioned in the reactor 10. At its lowermost position, plug 25 serves to effectively seal off the opening of the discharge port 13.

A two-blade paddle agitator 49 having a hollow shaft 50 is placed within the reactor 10, the filtrate take-off lines 35 and 41 from the two compartment filter element 29 passing upward out through the reactor up through shaft 50.

Cover 19 is attached to reactor 10 by means of nut and bolt assemblies 20. A gasket 22 assures a tight seal between the top 19 and reactor flange 14.

The hollow paddle shaft 50 passes through center port 23 in cover 19. A tight, dynamic seal is assured by use of a packing gland seal and bearing assembly 56. This seal 56 provides a fluid and vapor tight seal, but still permits rotation of the paddle shaft 50. A sprocket 57 is affixed to the paddle shaft 50 above the packing gland assembly 56. This sprocket 57 in turn is connected through a continuous chain 58 to a drive mechanism (not shown). Alternate means for activating the paddle can be employed such as, for example, pulley and belt, cam, direct gear, worm gear and the like. Both rotary motion producing devices and oscillatory "back and forth" drive means can be used.

A dynamic seal is provided between the shaft 50 and outer fluid take-off line 41 by means of packing nut 51 and internal O-ring seal 52. This seal provides for a tight seal between the shaft 50 and line 41 as well as permits vertical movement of the filter assembly 24 within the reaction vessel 10.

A T-connector 59 connected to discharge line 60 and seal 61 provide for removal of filtrate from compartment 33 of the filter elements 29 and transport of this fluid to a receiver (not shown).

A second T-connector-seal assembly 62 attached to the upper end of take-off line 35 and discharge line 63 provides for moving filtrate from compartment 32 to a filtrate receiver (not shown).

The T-connector-seal assembly 62 is attached to a reciprocating air operated piston plunger assembly 64 which provides controlled vertical lifting and lowering of the entire filter 24 assembly and take-off lines 35 and 41 thereby opening and closing the seal for the discharge port 13 in the bottom of reactor vessel 10. Other means of vertically moving this assemby can be used in place of the air cylinder piston. Pure mechanical linkages, hydraulic systems, servomechanisms and drives, hand-lifts, etc. which will raise and lower the assembly all are suitable.

The shaft 50 and take-off lines 35 and 41 are held in proper alignment by means of a support member 65 affixed to the cover 19. A bearing, pillow block and set collar assembly 66 connected to support 65 holds and positions the shaft 50.

Additional processing equipment and control sensing devices, such as tank vibrators for solids removal, thermocouples for temperature control, supplementary agitators and stirrers, fluid flow controls and the like can be employed with the present apparatus. Stirrers and thermocouples can be inserted into the reactor through additional ports on the cover. Also, thermocouples can be run down through the fluid take-off lines, for example.

The following reaction and product preparation carried out in an embodiment of the apparatus similar to that described hereinbefore illustrates the utility of the present novel multiple purpose chemical processing apparatus.

About 1 part (on a gram-mole basis) of lithium perchlorate and 2 parts (on a gram-mole basis) of hydrazine were dissolved in alcohol at about 70° C. These products directly form the addition compound $$(LiClO_4 \cdot 2N_2H_4)$$

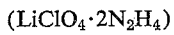

The resulting solution was charged to the reaction unit which had been purged with dry nitrogen.

Crystallization of the lithium perchlorate hydrazine adduct was initiated by circulating cold water through the jacket of the reactor to reduce the temperature of the reaction medium. Nitrogen was bubbled back through the filter to give added circulation and agitation of the mix as well as prevent plugging the filter during crystallization. The open-frame paddle agitator also was rotated slowly (from about 1 to about 30 revolutions per minute) during the period.

After about 2 hours, the temperature of the reaction mass had cooled from about 70° C. to about 13° C. and about 60% yield of product, based on theoretical yield, precipitated from the solution.

Filtration was started by inducing a reduced pressure on the take off lines. A header tank in the low pressure discharge line served as a receiver for the mother liquor. As the fluid level dropped below the level of the upper compartment of the filter, it was closed and the remainder of the filtering done through the lower compartment. Removal of the last traces of mother liquor was substantially a vacuum drying process. To facilitate drying of the product, the unit was heated to about 50° C. at the end of the filtration by passing warm water through the jacket.

At the completion of the drying step, the pressure was increased back to about normal atmospheric pressure by addition of nitrogen and the unit cooled back to about 13° C. The product was washed with ether which was charged through a feed line in the cover. Following the wash, the ether was removed by filtration and the product dried by following the procedure set forth hereinbefore.

The dried product crystals were removed from the reactor by raising the filter to allow movement of the crystals out of the discharge port at the bottom of the vessel. Control of product removal was accomplished by means of a flexible hose delivery tube and air-actuated clamp. During the product delivery from the reactor, the paddle agitator was rotated. This device which had a clearance of from about 1/16 to about 1/8 inch between the outer frame member and inner wall of the reactor served to effectively scrape from the reactor wall crystals which had built up thereon.

Other applications for which this apparatus is particularly suitable are in the handling and processing of materials that are moisture- or air-sensitive and which require any or all of the operations of crystallizing, precipitating, filtering, drying, blending and packaging.

Various modifications can be made in the present invention without departing from the spirit or scope thereof for it is understood that we limit ourselves only as defined in the appended claims.

We claim:
1. A novel chemical processing unit which comprises in combination:
   (a) a reactor vessel, said reactor vessel having a discharge port in its lower end and a removable top cover, said cover defining a center port,
   (b) a hollow shaft paddle agitator in said reactor, the shaft from said agitator passing upward through a dynamic seal in the center port of said cover, and
   (c) a filter assembly, said filter assembly being positioned in said reactor and vertically movable therein, said filter assembly having a plug at its lower end, said plug sealing off the discharge port in said reactor when in contact therewith, said filter assembly being fitted with a fluid take-off line which passes upward through the interior of the hollow shaft of said paddle agitator.

2. A novel chemical processing unit which comprises in combination:
   (a) a reactor vessel, said vessel having a cylindrical upper section and a conical bottom section, the lower end of said conical bottom section tapering inwardly to a discharge port,
   (b) a detachable cover for said vessel, said cover defining a center port,
   (c) a paddle agitator, said agitator having a hollow shaft, the outer edges of said paddle conforming to the inner wall of said reaction vessel and providing a close clearance therebetween, said shaft passing through a dynamic seal in the center port of said cover, and
   (d) a filter assembly in said reactor vessel, said filter assembly provided with a plug at its bottom, said plug sealing off the discharge port in the bottom of said reaction vessel when in contact therewith, fluid take-off means attached to said filter, said fluid take-off means passing up through the hollow shaft of said agitator, said take-off means exiting from said shaft through a dynamic seal and said filter assembly being vertically movable within said reaction vessel.

3. A novel chemical processing unit which comprises in combination:
   (a) a hollow jacketed reaction vessel, said vessel having a cylindrical upper section and a conical bottom section, the lower end of said conical bottom section tapering inwardly to a discharge port,
   (b) a detachable top cover for said reaction vessel, said cover defining a center port, (c) a two-bladed open-frame paddle agitator, said agitator having a hollow shaft, the blades being positioned on opposite sides of said shaft, the outer frame members of said blades matching the contour of the inner wall of said reactor and providing a close clearance therewith, the inner members of said blades being spaced apart to accommodate a filter assembly and allow vertical movement of said filter assembly, said hollow shaft passing through a dynamic seal in the center port of said cover.

(d) a filter assembly, said filter assembly consisting of a conical plug bottom member, said plug fitting snugly against the sloping inner wall of said reactor vessel thereby effectively sealing off said discharge port, a tubular, two compartment filter element attached to the top of said plug, said compartment being positioned one above the other, separate fluid take-off lines for each compartment of said filter, each said take-off lines having its lower end near the bottom of said compartment and said take-off lines from said lower compartment passing through said upper compartment being inside and concentric with said take-off line from said second compartment thereby forming an annulus between said first and second take-off lines, said take-off lines passing through the interior length of said hollow paddle agitator, exiting therefrom through a dynamic seal, (e) a discharge line for receiving fluid from each of said take-off lines, (f) reciprocating means for vertically raising and lowering said filter assembly within said reactor, and (g) drive means for rotating said paddle agitation within said reactor vessel.

References Cited by the Examiner

UNITED STATES PATENTS 2,125,532　8/1938　Wells.
3,117,084　1/1964　Nick et al. _____ 210—241

MORRIS O. WOLK, *Primary Examiner.*

JAMES H. TAYMAN, Jr., *Examiner.*